United States Patent Office 3,338,641
Patented Aug. 29, 1967

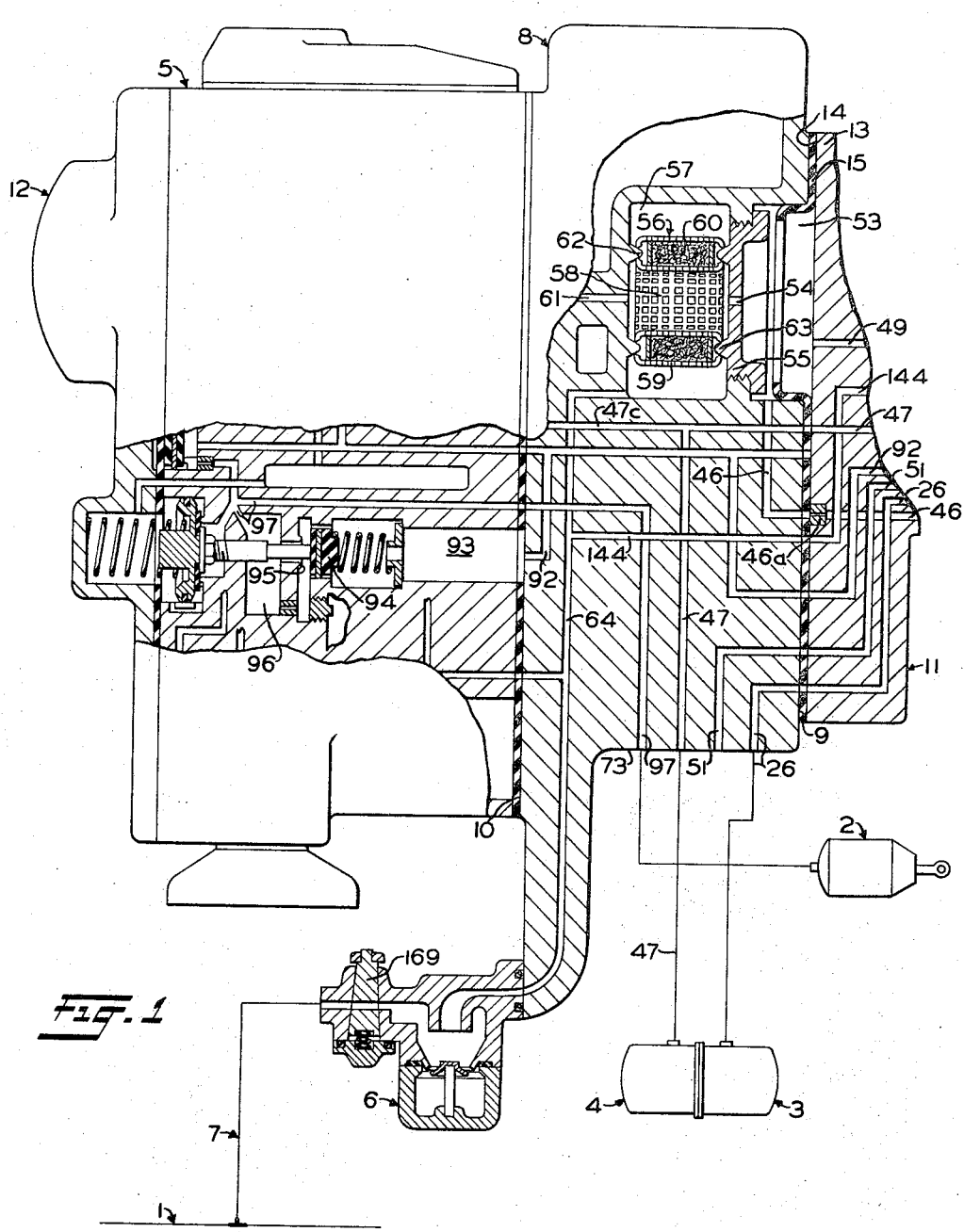

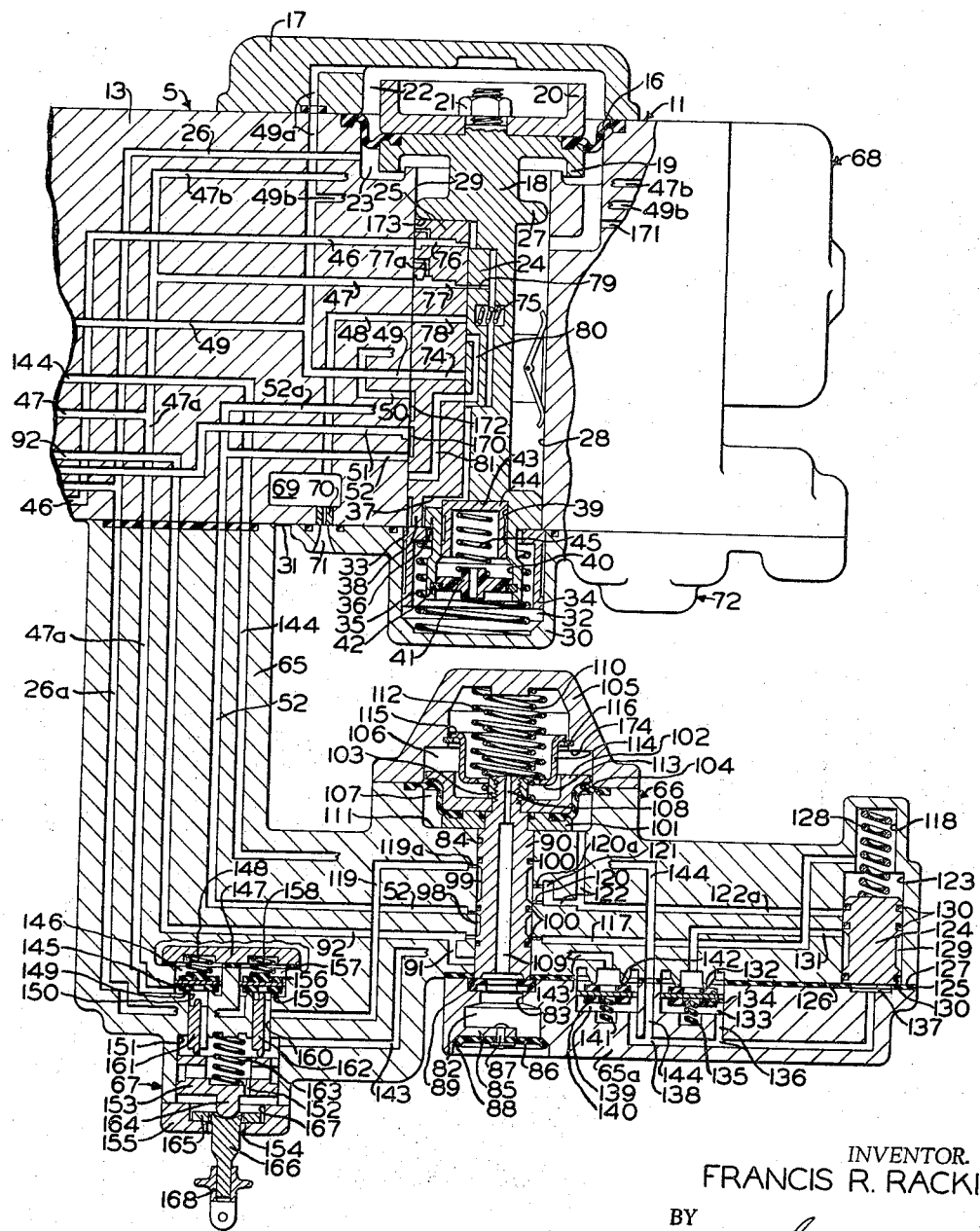

3,338,641
FLUID PRESSURE BRAKE CONTROL VALVE
DEVICE WITH MANUAL BRAKE CYLINDER
RELEASE FEATURE
Francis R. Racki, Pittsburgh, Pa., assignor to Westinghouse Air Brake Company, Wilmerding, Pa., a corporation of Pennsylvania
Filed Dec. 23, 1965, Ser. No. 516,010
6 Claims. (Cl. 303—69)

ABSTRACT OF THE DISCLOSURE

A brake cylinder pressure release valve device, for interposition between a control valve device and a brake cylinder device, operation of which, while brake cylinder pressure is below a chosen pressure, effects release of pressure from the brake cylinder device without reduction of pressure in the auxiliary reservoir and which is restored automatically, subsequent to this release, to a position in which fluid under pressure may be resupplied to the brake cylinder device, and operation of which, while brake cylinder pressure is above this chosen pressure, effects release of pressure from the brake cylinder device without restoration to its resupply position until a brake release is effected.

---

In Patent 3,232,678 issued Feb. 1, 1966, to William G. Wilson, and assigned to the assignee of the present application, there is shown and described a brake control valve device that includes, in addition to the conventional service portion and emergency portion, a two-position diaphragm-type brake cylinder release valve device and a manually operative reservoir release valve device for controlling the supply of fluid under pressure from an auxiliary reservoir to the diaphragm-type brake cylinder release valve device to effect the operation thereof to completely release fluid under pressure from a brake cylinder device to atmosphere thereby releasing a previously effected brake application on the car.

The two-position diaphragm-type brake cylinder pressure release valve device included in the brake control valve device disclosed in the abovementioned Wilson patent is operable to a brake cylinder pressure releasing position in response to manual actuation by a trainman of an auxiliary reservoir release valve device to cause the flow of fluid under pressure from the auxiliary reservoir to a chamber at one side of the diaphragm of the brake cylinder pressure release valve device. However, once this diaphragm-type brake cylinder release valve device has been actuated to its brake cylinder pressure releasing position, it remains in this position until the brake control valve device is returned to its release position in response to an increase in the pressure in the train brake pipe.

The Association of American Railroads adopted, effective Aug. 1, 1962, a specification for brake cylinder release valves for freight brake equipment which states:

"The brake cylinder release valve (a) must permit the further flow of air from the auxiliary and emergency reservoirs to the brake cylinder or cylinders if at the time of its actuation the brake cylinder pressure, under a partial service application, is 30 p.s.i. or less; and (b) must prevent the further flow of air from the auxiliary and emergency reservoirs to the brake cylinder or cylinders, if at the time of its actuation the brake cylinder pressure is 40 p.s.i. or higher."

As stated above, once the diaphragm-type brake cylinder release valve device of the brake control valve device shown and described in the abovementioned patent has been actuated to its brake cylinder pressure releasing position, it remains in this position until the brake control valve device is returned to its release position regardless of the pressure in the brake cylinder device at the time of actuation or operation of the diaphragm-type brake cylinder release valve device to its brake cylinder pressure releasing position. Therefore, it is obvious that the diaphragm-type brake cylinder release valve device included in the brake control valve device disclosed in the above-mentioned patent fails to meet the specifications set forth by the Association of American Railroads for brake cylinder release valve devices for use in railway freight brake equipments.

Accordingly, it is the general purpose of this invention to provide a brake control valve device having a novel brake cylinder pressure release valve device that conforms to the specification of the Association of American Railroads in that subsequent to its actuation to release fluid under pressure from the brake cylinder device it provides for the further flow of fluid under pressure from the auxiliary and emergency reservoirs to the brake cylinder device in response to a reduction in brake pipe pressure subsequent to effecting a partial application of brakes in which the pressure supplied to the brake cylinder device is thirty pounds per square inch or less, and in that it prevents the further flow of fluid under pressure from the auxiliary and emergency reservoirs to the brake cylinder device in response to a reduction in brake pipe pressure subsequent to effecting a previous brake application if the pressure supplied to the brake cylinder device at the time of effecting the previous brake application is forty pounds per square inch or higher.

According to the present invention, a diaphragm-type brake cylinder pressure release valve device comprises a diaphragm-operated spool-type release valve in which the diaphragm is subject on one side to both a caged and an uncaged spring and on the opposite side to fluid under pressure initially supplied thereto from an auxiliary reservoir in response to manual operation of an auxiliary reservoir release valve and thereafter supplied with fluid under pressure from the brake cylinder port and corresponding passageway of a brake control valve device whereby the spool-type valve is moved to a first brake cylinder pressure releasing position whenever brake cylinder pressure is less than a chosen value. In such first position, all of the fluid under pressure supplied to the opposite side of the diaphragm is subsequently released therefrom at a restricted rate so that the spool-type valve is restored to its original position in order that fluid under pressure can again be supplied to the brake cylinder device in response to a subsequent reduction in brake pipe pressure. Moreover, the spool-type valve is moved to a second brake cylinder pressure releasing position whenever brake cylinder pressure is in excess of said chosen value in which second position the spool-type valve remains until the brake control valve device is returned to its brake release position in response to an increase in the pressure in the brake pipe to cause the brake control valve device to return to its brake release position.

In the accompanying drawings:

FIG. 1 and FIG. 2, when taken together such that the right-hand edge of FIG. 1 is matched with the left-hand edge of FIG. 2, constitutes a diagrammatic view, mainly in section, of an improved and upgraded "AB" type brake control valve device embodying the invention which comprises a novel brake cylinder pressure release valve device for manually controlling the release of fluid under pressure from a brake cylinder device associated with the brake control valve device in a fluid pressure railway freight car brake equipment.

Description

As shown in FIGS. 1 and 2 of the drawings, when the right-hand edge of FIG. 1 is placed alongside of the left-hand edge of FIG. 2, an improved and upgraded freight car fluid pressure brake equipment embodying the invention comprises a brake pipe 1 that extends from one end of the car to the other, a brake cylinder device 2, an auxiliary reservoir 3, an emergency reservoir 4, and a brake controlling valve device 5 connected to the brake pipe 1 through a combined cut-out cock and centrifugal dirt collector 6 and a branch pipe 7.

The brake controlling valve device 5 may comprise a pipe bracket 8 having gasket faces 9 and 10 disposed opposite each other, a service portion 11 and an emergency portion 12. These parts described above are standard components of the well-known AB freight car brake equipment now used on the freight cars of most American railroads except the service portion 11 has been upgraded to provide a service accelerated release feature.

Briefly, however, the service portion 11 of the brake controlling valve device 5 comprises a sectionalized casing including a casing section 13 that has formed on its left-hand side a gasket face 14. (FIG. 1) between which and the gasket face 9 formed on the pipe bracket 8 is disposed a gasket 15, it being understood that the casing section 13 is secured to the pipe bracket 8 by any suitable means (not shown).

As shown in FIG. 2 of the drawings, the service portion 11 further comprises a diaphragm or diaphragm-type of piston 16 that has its outer periphery clamped between adjacent faces formed on the casing section 13 and a cover member 17 that is secured to the casing section 13 by any suitable means (not shown).

The inner periphery of the diaphragm 16 is operatively connected to one end of a service valve operating stem 18 having formed integral therewith adjacent the one end thereof a first diaphragm follower 19 by means such as a second diaphragm follower 20 and a nut 21 that has a screw-threaded engagement with screw-threads formed on one end of operating stem 18.

The diaphragm 16 cooperates with the casing section 13 and the cover member 17 to form within the service portion 11 of the brake controlling valve device 5 and on the respective opposite sides of the diaphragm 16, two chambers 22 and 23. The chamber 23 contains the service valve operating stem 18 which is adapted to operate a graduating valve 24 and a service slide valve 25 also contained in the chamber 23 which is connected to the auxiliary reservoir 3 (FIG. 1) via a passageway 26 extending through the casing section 13 and the pipe bracket 8, and a pipe bearing the same numeral.

The service valve operating stem 18 is provided adjacent the first diaphragm follower 19 with a disc-like guide member 27 which is slidably mounted in a bore 28 formed in the casing section 13. The purpose of the guide member 27 is to give a stabilizing effect to the diaphragm 16 and prevent the service slide valve 25 from being raised from its seat by fluid under pressure in the ports opening at the surface of a slide valve seat 29 upon which the service slide valve 25 is slidably mounted.

The chamber 23 is closed by a cap or back cover 30 which is secured to a flat surface 31 formed on the bottom of the casing section 13 by any suitable means (not shown). This back cover 30 has formed therein a recess 32 which defines the lower end of the chamber 23 and which has a diameter greater than the diameter of the bore 28. Accordingly, the casing section 13 forms at the lower end of the bore 28 a stop shoulder 33 against which a stop member 34, slidably mounted in the cap 30, is adapted to abut to limit upward movement of the stop member 34. Interposed between the stop member 34 and the cap 30 is a spring 35 which at all times tends to move or bias the stop member 34 toward the stop shoulder 33.

The lower end portion of the service valve operating stem 18 extends through a central opening in the stop member 34 and is provided with an operating collar or lug 36, the lower side of which is adapted to contact the stop member 34 and the upper side of which is adapted to operatively contact a lower end surface 37 of the service slide valve 25.

The service slide valve 25 is provided with a lug 38 extending from the lower end thereof which lug 38 contacts the stop member 34 to effect movement of this stop member against the yielding resistance of the spring 35 when the parts of the service portion 11 of the brake controlling valve device 5 are being moved from a normal release position in which they are shown in FIG. 2 to an inner or retarded release position.

The low end of the service valve operating stem 18 is provided with a bore 39 and a coaxial counterbore 40. The lower end of the counterbore 40 is closed by a shouldered plug 41 that is retained in the counterbore 40 by a snap ring 42 that is inserted in a groove formed in the wall surface of the counterbore 40. Formed on the service valve operating stem 18 at the upper end of the bore 39 therein is a stop shoulder 43 adapted to act as a stop for a plunger 44 which is slidably mounted within the bore 39. Interposed between the plunger 44 and the shouldered plug 41 is a spring 45 which acts to normally maintain the plunger 44 in contact with the stop shoulder 43. In this position, the upper end of the plunger 44 will be closer to the lower end surface 37 of the service slide valve 25 than will be the upper side of the collar 36 of the service valve operating stem 18, so that in effecting an application of the brakes the plunger 44 will move into contact with the service slide valve 25 and yieldably resist, by reason of the spring 45, relative movement of the diaphragm 16 and graduating valve 24 before the collar 36 on the service valve operating stem 18 contacts the service slide valve 25. The purpose of this is to stabilize the action of the parts of the service portion 11, as will hereinafter more fully appear. This stabilizing mechanism also serves as a graduating spring for shifting the diaphragm 16, stem 18 and graduating valve 24 to service lap position.

The emergency portion 12 shown in FIG. 1 of the drawing is substantially the same in construction and operating as the emergency valve device of the well-known AB control valve device. Only such parts of the emergency portion 12 will be hereinafter described as are necessary for an understanding of the operation of the service portion 11.

As shown in FIG. 2 of the drawings, there are seven passageways opening through respective corresponding ports at the face of the service slide valve seat 29, the passageways and ports being respectively designated by the numerals 46, 47, 48, 49, 50, 51 and 52.

The port 46 is connected by its correspondingly numbered passageway in the service slide valve seat 29, the casing section 13 of the service portion 11 and the pipe bracket 8 to a chamber 53 (FIG. 1) formed by the cooperative relationship of the casing section 13 and the pipe bracket 8 there being a choke 46a disposed in the passageway 46 to control the rate of flow between chambers 53 and 23. The chamber 53 in turn is open through a restricted port or choke 54 in a screw plug 55 having screw-threaded engagement with a screw-threaded bore formed in the pipe bracket 8 into the interior of a strainer device 56 that is disposed in a chamber 57 formed in the pipe bracket 8. The strainer device 56 is inserted through the open end of the chamber 57 prior to inserting the screw plug 55 into the screw-threaded bore in the pipe bracket 8 which plug 55 secures the strainer device 56 to the pipe bracket 8 as shown in FIG. 1 of the drawings. The strainer device 56 comprises a perforated tubular retainer 58 and a perforated tubular retainer 59 which surrounds the retainer 58. The space between the retainers 58 and 59 is packed with hair 60 or any other material suitable for separating dirt, moisture or the like from a stream of fluid under pressure. The inner surface of the retainer 58 defines a passageway which is open to the chamber 53 through the choke 54 in the screw plug 55 as hereinbefore mentioned. This passageway is also open to an emergency piston chamber (not shown) in the emergency portion 12 of the brake controlling valve device 5 via a passageway 61 in the pipe bracket 8. The inner end wall of the chamber 57 is provided with a ring 62 and the screw plug 55 is provided with a similar ring 63 between which rings the strainer device 56 is clamped by the screw plug 55.

The brake pipe 1 is connected to the chamber 57 via the branch pipe 7, the combined cut-out cock and centrifugal dirt collector 6, and a passageway 64 in the pipe bracket 8.

The port 47 (FIG. 2) is connected by its correspondingly numbered passageway in the service slide valve seat 29, the casing section 13, and the pipe bracket 8 and a pipe bearing the same numeral to the emergency reservoir 4 (FIG. 1).

A first branch passageway 47a, extending through the casing section 13 and a casing section 65 of a sectionalized casing of a brake cylinder pressure release valve device 66 secured to the flat surface 31 on the bottom of the casing section 13 by any suitable means (not shown), connects the passageway 47 to a reservoir release valve device 67 which is substantially the same as the reservoir release valve shown and described in the above-mentioned patent of William G. Wilson.

A second branch passageway 47b in the casing section 13 connects that portion of the passageway 47 therein to an accelerated release valve device 68 which is substantially the same as the accelerated release valve device 52 shown and described in the above-mentioned Wilson patent.

A third branch passageway 47c (see FIG. 1) in the pipe bracket 8 connects that portion of the passageway 47 therein to the right-hand face of an emergency piston (not shown) in the emergency portion 12 of the brake controlling valve device 5.

The port 48 is connected by its correspondingly numbered passageway in the service slide valve seat 29 and the casing section 13 to a quick service volume chamber 69 in the casing section 13, which volume chamber is constantly open to atmosphere via a choke 70 carried by the casing section 13 and a passageway 71 formed in the back cover 30.

The port 49 is connected by its correspondingly numbered passageway in the service slide valve seat 29 and the casing section 13 to the hereinbefore-mentioned chamber 53.

A first branch passageway 49a extending through the casing section 13 and cover member 17 connects the passageway 49 to the chamber 22 above the diaphragm 16.

A second branch passageway 49b extending through the casing section 13 connects the first branch passageway 49a therein to the hereinbefore-mentioned accelerated release valve device 68 for a purpose made apparent in the above-mentioned Wilson patent.

The port 50 is connected by its correspondingly numbered passageway in the service slide valve seat 29 and the casing section 13 to a conventional quick service limiting valve device 72 which forms no part of the present invention and operates substantially the same as the quick service limiting valve device 81 shown and described in the above-mentioned Wilson patent.

The port 51 is connected by its correspondingly numbered passageway in the service slide valve seat 29, casing section 13 and pipe bracket 8 to atmosphere. It should be understood that if a brake cylinder pressure retaining valve device is used with the brake controlling valve device 5, the brake cylinder pressure retaining valve device is connected by a pipe (not shown) to that end of the passageway 51 that is open to atmosphere at a flat surface 73 formed on the bottom of the pipe bracket 8 as shown in FIG. 1.

The port 52 is connected by its correspondingly numbered passageway in the service slide valve seat 29, casing section 13, and casing section 65 to the above-mentioned brake cylinder pressure release valve device 66 for a purpose hereinafter made apparent.

A first branch passageway 52a in the casing section 13 connects that portion of the passageway 52 therein to the hereinbefore-mentioned conventional quick service limiting valve device 72.

It will be noted that with the service slide valve 25 in its outer or normal release position, as shown in FIG. 2, the passageway and corresponding port 49 is in alignment with a first passageway 74 extending horizontally through the service slide valve 25, the right-hand end of which is blanked off or lapped by the graduating valve 24 which is biased against the right-hand face of the service slide valve 25 by a spring 75 interposed between the service valve operating stem 18 and the right-hand side of the graduating valve 24.

It will also be noted that, while the service slide valve 25 occupies its normal position shown in FIG. 2, the passageways and corresponding ports 46, 47 and 48 are respectively in alignment with a second passageway 76, a third passageway 77, and a fourth passageway 78 extending horizontally through the service slide valve 25.

It will be further noted that, while the service slide valve 25 occupies its normal release position shown in FIG. 2, (1) the upper end of the graduating valve 24 is disposed below the right-hand end of the passageway 76 so that this passageway 76 establishes a communication between the passageway 46 and the chamber 23, (2) the right-hand end of the passageway 77 registers with a first passageway 79 extending through the graduating valve 24 so that the passageways 77 and 79 cooperate to establish a communication between the passageway 47 and the chamber 23, and (3) the right-hand end of the passageway 78 is blanked or lapped off by the graduating valve 24.

It will be also noted from FIG. 2 of the drawings that the graduating valve 24 is provided with a second passageway 80, the opposite ends of which open at the left-hand face of the graduating valve 24, and that the service slide valve 25 is provided with a fifth passageway 81, the opposite ends of which open at the respective opposite sides of the slide valve 25, this passageway 81 being so located that the right-hand end thereof is in alignment with one end of the passageway 80 in the graduating valve 24 while this graduating valve and the service slide valve 25 occupy their normal release position in which they are shown in FIG. 2.

The sectionalized casing of the hereinbefore-mentioned brake cylinder pressure release valve device 66 includes a second casing section 65a in which is provided a chamber 82 into which opens one end of a bore 83 the opposite end of which opens into one end of a coaxial bore 84 formed in the casing section 65. The casing section 65a has formed integral therewith a horizontally disposed arm 85 to which a dished circular rubber shield 86 is secured by a centrally disposed rivet 87 that extends through coaxial bores in the shield 86 and arm 85. The circumferential surface of the shield 86 is adapted to contact a substantially conical inner surface 88 formed on the bottom of the second casing section 65a for preventing access to the chamber 82 of particles of foreign matter or by nest-building insects such as, for example, mud wasps. A plurality of notches or grooves are formed in the outer edge of the shield 86 for preventing sealing contact thereof with the inner surface 88. It will be noted that the surface 88 formed on the second casing section 65a extends somewhat beyond the rubber shield 86 so as to provide an adequate protection against the formation of ice over the opening in the lower side of the second casing section 65a, and that the shield 86 has sufficient area and flexibility to insure its displacement under the pressure of fluid in the chamber 82 to eject any foreign matter that might reach this chamber.

Disposed at the lower end of the bore 84 and between casing sections 65 and 65a, is a resilient annular valve seat member 89 which may be constructed of, for example, rubber or some other suitable material. Slidably mounted in the bore 84 above the valve seat member 89 is a three-position spool-type brake cylinder release valve 90 the lower end of which is dished to provide a short sleeve-like portion which, while the release valve 90 occupies the position shown in FIG. 2 of the drawings, forms a seal with the valve seat member 89 to prevent flow of fluid under pressure from a second passageway 91 formed in the casing section 65, and opening at one end at the wall surface of the bore 84 slightly above the annular valve seat member 89, to the chamber 82.

The other end of the passageway 91 opens into a third passageway 92 in the casing section 65 intermediate the ends of this passageway 92 which at one end opens at the wall surface of the bore 84 at a location somewhat above the location at which the one end of the passageway 91 opens at the wall surface of this bore. The passageway 92 extends through the casing section 65, casing section 13, and pipe bracket 8 (FIG. 1) to a first chamber 93 in the emergency portion 12 of the brake controlling valve device 5. The chamber 93 is connected past an inshot valve 94 when unseated from an annular valve seat 95 to a second chamber 96 in the emergency portion 12 which chamber 96 in turn is connected to the brake cylinder device 2 via a passageway 97 extending through the emergency portion 12 and the pipe bracket 8, and a pipe bearing the same numeral.

Referring again to FIG. 2 of the drawings, it will be noted that the spool-type brake cylinder release valve 90 is provided with two spaced-apart elongated peripheral annular grooves 98 and 99 and with three peripheral annular grooves, one between the elongated peripheral annular grooves 98 and 99 and one adjacent the respective outer end of each of the elongated peripheral annular grooves 98 and 99, in each of which is disposed an O-ringe 100 which forms a seal with the wall surface of the bore 84 to prevent leakage of fluid under pressure from either of the elongated peripheral annular grooves 98 and 99 to the other and also from the respective outer ends of these grooves along the length of the spool-type release valve 90 to the corresponding end thereof.

The upper end of the spool-type release valve 90 is provided with two portions of reduced diameter to form two spaced-apart shoulders against which rest respectively two diaphragm followers 101 and 102 which are forced toward each other by a nut 103 having screw-threaded engagement with screw threads formed on the upper end of the release valve 90 to clamp between these diaphragm followers the inner periphery of a diaphragm 104. The outer periphery of the diaphragm 104 is clamped between the casing section 65 and a substantially cup-shaped cover member 105 that is secured to the casing section 65 by any suitable means (not shown).

The diaphragm 104 cooperates with the casing section 65 and the cover member 105 to form within the brake cylinder pressure release valve device 66 and on the respective opposite sides of the diaphragm 104, two chambers 106 and 107. The chamber 106 is open to atmosphere via a bore 108 and a coaxial counterbore 109 extending longitudinally through the spool-type release valve 90, the bore 83, the chamber 82, and past the shield 86 which is deflected away from the conical surface 88 whenever the pressure in the chamber 82 exceeds atmospheric pressure to provide for flow of fluid under pressure from the chamber 82 to atmosphere.

Disposed in the chamber 106 and interposed between the diaphragm follower 102 and the cup-shaped cover member 105 is a first spring 110 which is effective in the absence of fluid under pressure in the chamber 107 to bias the diaphragm follower 101 against a stop surface 111 formed on the casing section 65.

Also disposed in the chamber 106 in concentric relation to the first spring 110 is a second spring 112 which is caged by being interposed between the cup-shaped cover member 105 and an inturned flange 113 formed at one end of a spring seat 114.

Prior to securing the cover member 105 to the casing section 65, the cover member 105, the spring 112 and the spring seat 114 are assembled as follows:

First, the cup-shaped cover member 105 is placed on a table or work bench in a position inverted from the position shown in FIG. 2.

Next, the spring 112 is placed in the cup-shaped cover member 105 after which the spring seat 114 is placed in surrounding relation to the spring 112 so that the inturned flange 113 on the spring seat 114 rests against the upper end of the spring.

Following assembling the cover member 105, spring 112, and spring seat 114 as described above, a force is applied by any suitable means to the inturned flange 113 of the spring seat 114 to effect compression of the spring 112 and movement of the spring seat 114 relative to the cover member 105 to a position in which an outturned flange 115 formed at the opposite end of the spring seat 114 is so disposed relative to a groove formed in the cover member 105 that a snap ring 116 can be inserted into this groove.

Subsequent to inserting the snap ring 116 into the groove in the cover member 105, the force can be removed from the inturned flange 113 of the spring seat 114 whereupon the spring 112 is rendered effective via the spring seat 114 to bias the outturned flange 115 on this spring seat against the snap ring 116.

Assuming that the first spring 110 has been placed so that one end rests against the diaphragm follower 102 in surrounding relation to the nut 103, the assembly described above can be lowered over the spring 110, with the second spring 112 disposed in concentric relation therewith, until the cover member 105 abuts the casing section 65. The cover member 105 is now secured to the casing section 65 by any suitable means as herein-before-mentioned.

It should be noted that the strength of the springs 110 and 112 is such that in order to conform to the hereinbeforementioned specification of the Association of American Railroads for brake release valves for freight brake equipment, a pressure of forty pounds per square inch must be present in the chamber 107 below the diaphragm 104 before this diaphragm can effect upward movement of the spring seat 114 from the position shown in FIG. 2 against the combined yielding resistance of the springs 110 and 112 so that the out-turned flange 115 on this spring seat 114 is moved upwardly and out of contact with the snap ring 116. In other words, a pressure of forty pounds per square inch is required in the chamber 107 before the three-position spool-type brake cylinder release valve 90 can be moved from its second position to its third position.

While the three-position spool-type brake cylinder release valve 90 occupies the first of its three positions, in which position it is shown in FIG. 2, the elongated peripheral annular groove 98 thereon is effective to establish a communication between the hereinbeforementioned passageways 52 and 92 in the casing section 65 and also a communication between these passageways and a fourth passageway 117 in the casing section 65, one end of which passageway 117 opens at the wall surface of the bore 84 diametrically opposite the opening of the passageway 92 at the wall surface of this bore 84. The opposite end of the passageway 117 opens at the wall surface of a blind bore 118 formed in the casing section 65, the axis of which blind bore 118 is disposed in parallel spaced-apart relation to the axis of the bore 83 and coaxial bore 84.

Also, while the three-position spool-type brake cylinder release valve 90 occupies the first of its three positions, the elongated peripheral annular groove 99 thereon is effective to establish a communication between a fifth passageway 119 in the casing section 65, one end of which passageway 119 opens through a restriction or choke 119a at the wall surface of the bore 84, and each of two short passageways 120 and 120a in the casing section 65. One end of each of these passageways opens at the wall surface of the counterbore 94, these ends being arranged one vertically above the other in spaced-apart relationship. The opposite end of each of the passageways 120 and 120a opens into a chamber 121 formed in the casing section 65.

The chamber 121 is connected by a passageway 122 in the casing section 65 to the hereinbefore-mentioned chamber 107 below the diaphragm 104. The passageway 122 has a branch passageway 122a that opens at the wall surface of a counterbore 123 formed in the casing section 65 coaxial with the hereinbefore-mentioned blind bore 118 in this casing section.

As shown in FIG. 2 of the drawings, a spool-type piston valve 124 is slidably mounted in the counterbore 123. The piston valve 124 is biased against a ported gasket 125 interposed between a flat surface 126 formed on the bottom of the first casing section 65 and a corresponding flat surface 127 formed on the second casing section 65a by means of a spring 128 that is interposed between the end of the blind bore 118 and the upper end of the piston valve 124.

Intermediate its ends the piston valve 124 is provided with an elongated peripheral annular groove 129. The piston valve 124 is further provided adjacent the lower end of the elongated peripheral annular groove 129 with a peripheral annular groove in which is disposed an O-ring 130, and adjacent the upper end of this elongated peripheral annular groove 129 with two spaced apart peripheral annular grooves are so located that while the piston valve 124 occupies the position shown in FIG. 2, the O-rings 130 carried therein form a seal with the wall surface of the counterbore 123 to prevent flow of fluid under pressure from the branch passageway 122a to the upper end of the counterbore 123 and to a passageway 131 formed in the casing section 65 one end of which passageway 131 opens at the wall surface of the counterbore 123 below the location at which one end of the branch passageway 122a opens at the wall surface of this counterbore.

As shown in FIG. 2, the other end of the passageway 131 opens within an annular valve seat 132 formed on the bottom of the first casing section 65 which cooperates with the second casing section 65a to form a chamber 133. Disposed in the chamber 133 is a flat disc-type check valve 134 between which and the second casing section 65a is interposed a spring 135 which is normally effective to bias the flat disc-type check valve 134 into seating contact with the annular valve seat 132 to close communication between the passageway 131 and chamber 133 and positively prevent flow of fluid under pressure from the chamber 133 to the passageway 131.

Opening into the chamber 133 is one end of a first passageway 136 formed in the second casing section 65a. The opposite end of the passageway 136 opens into a chamber 137 below the piston valve 124 via a port formed in the gasket 125.

Opening into the first passageway 136 intermediate the ends thereof is one of a second passageway 138 formed in the second casing section 65a. The opposite end of this second passageway 138 opens into a chamber 139 formed by the cooperative relationship of the casing sections 65 and 65a. Disposed in the chamber 139 is a flat disc-type check valve 140 between which and the casing section 65a is interposed a spring 141 which is normally effective to bias the flat disc-type check valve 140 into seating contact with an annular valve seat 142 formed on the casing section 65 to positively prevent flow of fluid under pressure from the chamber 139 to a third passageway 143 formed in the first casing section 65 one end of which passageway opens within the annular valve seat 142.

Opening into the passageway 138 intermediate the ends thereof is one end of a fourth passageway 144 formed in the second casing section 65a which passageway 144 also extends through the casing sections 65 and 13 and the pipe bracket 8 and opens at its other end into the hereinbefore-mentioned passageway 64 (FIG. 1) which is connected to the brake pipe 1 via the combined cut-out cock and dirt collector device 6 and the branch pipe 7. Consequently, whenever the brake pipe 1 is charged, fluid under pressure flows therefrom to the chamber 139 via the branch pipe 7, combined cut-out cock and dirt collector 6, and passageways 64, 144, and 138. Fluid under pressure also flows from the passageway 138 to the chambers 133 and 137 via the passageway 136 so that the chambers 139, 133, and 137 are all simultaneously charged with fluid under pressure from the brake pipe 1.

The hereinbefore-mentioned reservoir release valve device 67 comprises a first flat disc-type check valve 145 disposed in a first chamber 146 formed by the cooperative relationship of the casing section 65 and a cover member 147 between which is disposed a resilient sealing gasket.

Disposed in the chamber 146 and interposed between the flat disc-type check valve 145 and the cover member 147 is a spring 148 which is normally effective to bias this check valve into seated contact with an annular valve seat 149 formed at the upper end of a bore 150 formed in the casing section 65. Opening into the chamber 146 is one end of the hereinbefore-mentioned branch passageway 47a the opposite end of which is connected to the passageway 47 which, as hereinbefore explained, is connected by the pipe bearing the same numeral to the emergency reservoir 4. Consequently, while the flat disc-type check valve 145 is biased against the annular valve seat 149 by the spring 148, fluid under pressure present in the chamber 146 and the emergency reservoir 4 connected thereto cannot flow to atmosphere via the bore 150, a counterbore 151, a choke 152 formed in a follower 153 that is slidably mounted in the counterbore 151, and a bore 154 formed in a bottom cover member 155 that closes the lower end of the counterbore 151 and is secured to the casing section 65 by any suitable means (not shown).

The reservoir release valve device 67 further comprises a second flat disc-type check valve 156 disposed in a second chamber 157 formed by the cooperative relationship of the casing section 65 and the cover member 147 into which chamber opens one end of a branch passageway 26a that extends through the casing sections 65 and 13 and at its opposite end opens into the passageway 26 intermediate the ends thereof which passageway 26, as hereinbefore stated, is connected by a pipe bearing the same numeral to the auxiliary reservoir 3 (FIG. 1).

Disposed in the chamber 157 and interposed between the flat disc-type check valve 156 and the cover member 147 is a spring 158 which is normally effective to bias this check valve into seated contact with an annular valve seat 159 formed at the upper end of a bore 160 in the casing section 65 the axis of which bore 160 is arranged in parallel spaced-apart relation to the axis of the hereinbefore-mentioned bore 150.

A pair of actuating stems or rods 161 and 162 of unequal length are respectively slidably mounted in the bores 150 and 160 for effecting unseating of the respective flat disc-type check valves 145 and 156 against the yielding resistance of the corresponding springs 148 and 158. The lower end of the actuating rods 161 and 162 are supported on the upper side of the follower 153 between which and the casing section 65 is interposed a spring 163 which is effective to bias a stem 164 integral with the follower 153 against a head or flange 165 of a universally tiltable actuator 166 which head 165, as shown in FIG. 2, is normally seated on an internal flange formed by the bottom of a counterbore 167 that is coaxial with the bore 154 in the bottom cover member 155. The lower end of the actuator 166 is in the form of a stem which is press-fitted into a bore formed in a clevis 168 to the jaws of which may be pivotally connected an actuating rod (not shown).

It will be noted from FIG. 2 of the drawings that the respective other ends of the hereinbefore-mentioned passageways 119 and 143 open respectively at the wall surface of the bore 160 and counterbore 151.

OPERATION

Initial charging

To initially charge the brake equipment shown in FIGS. 1 and 2, fluid under pressure is supplied to the brake pipe 1 in the usual well-known manner, and with a cut-out valve 169 (FIG. 1), which constitutes the cut-out valve of the combined cut-out cock and centrifugal dirt collector 6, in its open position, as shown in FIG. 1 of the drawings, fluid thus supplied to the brake pipe 1 flows via branch pipe 7, cut-out valve 169, and passageway 64 to the strainer chamber 57 in the pipe bracket 8. Normally, fluid thus supplied to the chamber 57 flows through the strainer device 56 to the interior of the inner perforated tubular retainer 58 and from thence through the choke 54 in the screw plug 55 to the chamber 53. Fluid under pressure thus supplied to the chamber 53 flows therefrom to the chamber 22 (FIG. 2) above the diaphragm 16 via passageway 49 and branch passageway 49a, and to the slide valve chamber 23 below the diaphragm 16 via passageways 46 and 76 and choke 46a disposed in passageway 46.

Fluid under pressure also flows from the interior of the inner perforated tubular retainer 58 to an emergency piston chamber (not shown) in the emergency portion 12 of the brake control valve device 1 via the passageway 61.

Fluid under pressure supplied from the brake pipe 1 to the chamber 23 in the manner explained above, flows from this chamber to the auxiliary reservoir 3 via the passsageway and corresponding pipe 26, and to the emergency reservoir 4 via the passageway 79 in the graduating valve 24, passageway 77 in the service slide valve 25, and the passageway and corresponding pipe 47 so that both the auxiliary reservoir 3 and the emergency reservoir 4 are charged with fluid up to brake pipe pressure.

It will be noted from FIG. 2 that the branch passageway 26a connects the passageway 26 to the chamber 157 in the reservoir release valve device 67, and that the branch passageway 47a connects the passageway 47 to the chamber 146 in this valve device 67. Consequently, the chambers 146 and 157 are connected respectively to the emergency reservoir 4 and the auxiliary reservoir 3 and are charged to the same pressure as is present in these reservoirs.

While the service slide valve 25 occupies its release position shown in FIG. 2, the brake cylinder device 2 (FIG. 1) is open to atmosphere via pipe and corresponding passageway 97, chamber 96, past the annular valve seat 95 to the chamber 93 since the inshot valve 94 is unseated as shown, thence via passageway 92, elongated peripheral annular groove 98 (FIG. 2) on the spool-type brake cylinder release valve 90, passageway and corresponding port 52, a cavity 170 formed in the left-hand face of the service slide valve 25, and port and corresponding passageway 51.

As can be seen from FIG. 2, the elongated peripheral annular groove 98 on the spool-type brake cylinder release valve 90 establishes a communication between the passageway 117 and the passageway 52 which passageway 52 is open to atmosphere as explained above. Since the above-mentioned opposite end of the passageway 117 opens at the walls surface of the blind bore 118, it will be apparent that the interiors of this blind bore and the coaxial counterbore 123 above the piston valve 124 are open to atmosphere.

It will be noted that fluid under pressure supplied from the brake pipe 1 to the passageway 64, as described above, flows from this passageway 64 to the chamber 139 (FIG. 2) via the passageways 144 and 138. Since the passageway 138 is connected to the passageway 136, fluid under pressure from the brake pipe 1 will also flow to the chambers 133 and 137. Fluid under pressure thus supplied to the chamber 137 is effective to move the piston valve 124 upwardly against the yielding resistance of the spring 128 until the upper end of the piston valve 124 abuts the upper end of the counterbore 123. In this position of the piston valve 124, the elongated peripheral annular groove 129 thereon establishes a communication between the branch passageway 122a and the passageway 131 for a purpose made apparent in the hereinbefore-mentioned Wilson patent.

It should be understood that fluid under pressure supplied from the brake pipe 1 to the branch passageway 49a flows therefrom to the accelerated release valve device 68 via the branch passageway 49b, and that this valve device is connected to the emergency reservoir 4 via branch passageway 47b, and passageway and corresponding pipe 47, and to the auxiliary reservoir via passageway 171 (FIG. 2), service slide valve chamber 23, and passageway and corresponding pipe 26 in order that the accelerated release valve device 68 may operate in the same manner as the accelerated release valve device 52 shown in the above-mentioned Wilson patent.

Partial service application in which brake cylinder pressure developed is less than forty pounds per square inch Let it be supposed that it is desired to effect a brake application in which the pressure developed in the brake cylinder device 2 is less than forty pounds per square inch, for example thirty-seven and one half pounds per square inch. It is well known that in the AB freight car brake equipment an increase of two and one half pounds per square inch pressure is obtained in the corresponding brake cylinder device for each one pound per square inch pressure reduction effected in the corresponding brake pipe. Therefore, in order to effect a brake application in which the pressure obtained in the brake cylinder device 2, is, for example, thirty-seven and one-half pounds per square inch, the pressure in the brake pipe 1 will be reduced from a normal charged value of seventy pounds per square inch to fifty-five pounds per square inch at a service rate in the usual way. Since, as hereinbefore described, the brake pipe 1 is in communication with the chamber 22, the pressure of fluid in this chamber reduces at a service rate with the pressure in the brake pipe.

The coke 46a (FIG. 1) restricts the rate at which fluid under pressure can flow back form the service slide valve chamber 23 and thence to the brake pipe 1 so that the pressure in the chamber 23 is not reduced as fast as the pressure in the chamber 22. Accordingly, upon a predetermined, but light reduction in pressure in the chamber 22 (FIG. 2), the higher pressure of fluid in the slide valve chamber 23 establishes a differential of pressure to cause the diaphragm 16 to deflect upwardly, and, through the medium of the stem 18, shift the graduating valve 24 relative to the service slide valve 25. As the graduating valve 24 is thus shifted, the passageway 79 therein is moved out of alignment with the passageway 77 in the service slide valve 25, thus closing the communication between the slide valve chamber 23 and the emergency reservoir 4. At substantially the same time as the passageway 77 is closed by the graduating valve 24, the passageway 76 in the service slide valve 25 is lapped or closed by the graduating valve 24, so as to prevent back flow of fluid from the chamber 23 to the chamber 53 (FIG. 1). After the passageway 76 is closed, the continued deflection of the diaphragm 16 (FIG. 2) upwardly causes the lower end of the graduating valve 24 to open the right-hand end of the passageway 81 in the service slide 25, following which the plunger 44, mounted in the lower end of stem 18, contacts the lower end surface 37 of the service slide valve 25. The further upward movement of the graduating valve by the diaphragm 16 and relative to the service slide valve 25 is now resisted by the spring 45 acting through the stem 18. Now when a predetermined light reduction in brake pipe pressure in chamber 22 has been effected, say for instance about 1.2 pounds per square inch, a sufficient fluid pressure differential is created on the diaphragm 16 so that this diaphragm will be further deflected in an upward direction overcoming the resistance offered by the spring 45 and shifting the graduating valve 24 to preliminary quick service position. The diaphragm 16 is very sensitive to pressure differentials, and, therefore, quickly responds to a light but predetermined brake pipe reduction to move the graduating valve 24 relative to the service slide valve 25 to close the passageways 76 and 77 and to open the passageway 81, and then to move the graduating valve 24 to preliminary quick service position.

In the preliminary quick service position of the graduating valve 24, the passageway 80 therein connects the passageways 74 and 78 in the service slide valve 25. At the seat 29 of the service slide valve 25, as hereinbefore described, passageway 74 is in alignment with the passageway 49 which at all times is open to the brake pipe 1 via chamber 53 (FIG. 1), choke 54, strainer device 56, chamber 57, passageway 64 in the pipe bracket 8, cut-out valve 169 and branch pipe 7. Also, the passageway 78 (FIG. 2) is in alignment with the passageway 48 leading to the quick service volume chamber 69 in the casing section 13, which chamber 69 is constantly open to the atmosphere through the choke 70 and passageway 71. With the passageways 49 and 48 thus connected to each other, fluid under pressure is permitted to flow from the brake pipe 1 to the quick service volume chamber 69 and thence to atmosphere via choke 70 and passageway 71.

The initial local quick service flow of fluid from the brake pipe 1 to the quick service volume chamber 69 is at a fast rate until the brake pipe pressure substantially equalizes into the volume chamber 69 and then continues at a slower rate as governed by the choke 70. The initial flow of fluid to the volume chamber 69 produces a sudden limited quick service reduction in pressure in the brake pipe 1 for initially hastening the operation of the brake controlling valve device 5 on the next car which then operates in a similar manner, and in this way a quick serial response to the brake pipe reduction is transmitted from one car to the next throughout the length of the train.

After this sudden limited reduction in brake pipe pressure has been effected by flow of fluid to the quick service volume chamber 69, the quick service reduction continues at a slower rate through the choke 70. This continued reduction is for the purpose of insuring movement of the local service slide valve parts to service position. When graduating valve 24 moves to the initial quick service position, the lug 36 on the stem 18 contacts the lower end surface 37 on the service slide valve 25, so that upon further upward deflection of the diaphragm 16, the service slide valve 25 will be shifted in the same direction.

As the service slide valve 25 and the graduating valve 24 are shifted upward by the diaphragm 16 to service position in which diaphragm follower 20 abuts cover member 17, the passageways 76 and 77 in the service slide valve 25 are respectively moved out of registry with the ports and corresponding passageways 46 and 47 in the casing section 13, and a restricted branch 77a of the passageway 77 is moved into registry with the port and passageway 46. However, the passageways 76 and 77 are both lapped by the graduating valve 24 as stated above. Consequently, the slide valve chamber 23 is cut off from the brake pipe 1. Likewise, the passageways 78 and 74 in the service slide valve 25 are respectively moved out of registry with the ports and corresponding passageways 48 and 49 in the casing section 13 so that the slide valve 25 laps these ports and passageways to thereby close off further quick service flow of fluid from the brake pipe 1 to atmosphere by way of the quick service volume chamber 69. Fluid under pressure in the quick service volume chamber 69 thereafter flows to atmosphere via the choke 70 and passageway 71.

At substantially the same time as the ports and passageways 46, 47, 48 and 49 are lapped, the port opening from the passageway 81 at the left-hand face of the service slide valve 25 is cracked open to the port and passageway 52, it being remembered that the port opening from the passageway 81 at the right-hand face of the service slide valve 25 has been previously uncovered by the graduating valve 24. Therefore, fluid under pressure will now start to flow from the chamber 23 and the connected auxiliary reservoir 3 to the brake cylinder device 2 via the passageway 81 in the service slide valve 25, port 52 in seat 29 and the corresponding passageway 52 extending through casing sections 13 and 65, elongated peripheral annular groove 98 on brake cylinder release valve 90, passageway 92 extending through casing sections 65 and 13 and pipe bracket 8, chamber 93 (FIG. 1), past unseated inshot valve 94, chamber 96 and passageway and corresponding pipe 97.

In the service position of the service slide valve 25 a cavity 172 formed in the left-hand face of this slide valve establishes a communication between the port and corresponding passageway 49 and the port and corresponding passageway 50 in the casing section 13. Consequently, when the cavity 172 in the service slide valve 25 is moved into registry with the ports 49 and 50 in the slide valve seat 29, fluid under pressure flows from the brake pipe 1 to the brake cylinder device 2 via the conventional quick service limiting valve device 72 in the manner explained in the above-mentioned Wilson patent until the pressure in the brake cylinder device 2 builds up to, for example, ten pounds per square inch whereupon the limiting valve device 72 operates to cut off further flow of fluid under pressure therethrough from the brake pipe 1 to the brake cylinder device 2 and thus terminates the second stage of quick service operation.

It will be understood that the emergency portion 12 of the brake control valve device 5 operates in response to a service rate of reduction in the pressure in the brake pipe 1 in the same manner as the emergency portion of the well-known AB brake control valve device.

*Service lap*

In order to limit the degree of the service brake application to that in which the pressure developed in the brake cylinder device 2 is thirty-seven and one-half pounds per square inch, the brake pressure is reduced fifteen pounds per square inch. Then, when the auxiliary reservoir pressure in the chamber 23 is reduced by flow of fluid through the service ports and corresponding passageway 81 in the service slide valve 25 and the port and corresponding passageway 52 in the casing sections 13 and 65, peripheral annular groove 98 on the spool-type brake cylinder release valve 90, passageway 92, chamber 93 (FIG. 1), past open inshot valve 94, chamber 96, and passageway and corresponding pipe 97 to the brake cylinder device 2, an amount substantially equal to the degree of brake pipe reduction (fifteen pounds per square inch) in the chamber 22 (FIG. 2), the diaphragm 16, stem 18 and graduating valve 24 are deflected and moved downward from service position to service lap position, in which they are brought to a stop by a shoulder 173 on the stem 18 moving into contact with the upper end of the service slide valve 25. This deflection of the diaphragm 16 and movement of the stem 18 and graduating valve 24 is initiated by the action of the compressed spring 45 which cooperates with the stem 18 and service slide valve 25 to begin the downward deflection of the diaphragm and then to continue this deflection and move the graduating valve 24 toward service lap position, but just before the port opening at the right-hand side of the service slide valve 25 from the passageway 81 therein is fully lapped by the graduating valve 24, the end of the plunger 44 contacts the stop shoulder 43 on the stem 18 so that the spring 45 will no longer act to deflect the diaphragm 16 and move the stem 18 and graduating valve 24 toward lap position. Now, a slight pressure differential on the diaphragm 16, which will be caused by the pressure of fluid in the chamber 23 reducing slightly below the brake pipe pressure in the chamber 22 by flow to the brake cylinder device 2, deflects the diaphragm 16 downward and thereby moves, through the intermediary of the stem 18, the graduating valve 24 to lap position, in which one end of the passageway 80 in the graduating valve registers with the port and corresponding passageway 81 in the service slide valve 25 which passageway 81 registers with port and corresponding passageway 52 in casing sections 13 and 65, and the other end of this passageway 80 is closed by the service slide valve 25 so that the passageways 80, 81 and 52 are lapped to close off further flow of fluid under pressure from the auxiliary reservoir 3 to the brake cylinder device 2.

Also in service lap position of the graduating valve 24 the passageway 79 therein registers with the passageway 77 in the service slide valve 25 and the restricted branch 77a of the passageway 77 registers with the port and corresponding passage 46 in the casing section 13. Since fluid under pressure is supplied from the brake pipe 1 to the passageway 46 in a manner hereinbefore described in detail, it flows at a restricted rate determined by the size of the branch 77a of the passageway 77 to the chamber 23 and thence to the auxiliary reservoir 3 so that the pressure in the auxiliary reservoir is maintained against leakage so long as the rate of leakage from the auxiliary reservoir does not exceed the capacity of the restricted branch 77a.

*Manual release of brakes subsequent to a partial service application in which brake cylinder pressure developed is less than forty pounds per square inch*

Assuming a service brake application has been effected in which the pressure developed in the brake cylinder device 2 is less than forty pounds per square inch, for example the hereinbefore-mentioned thirty-seven and one-half pounds per square inch, let it be supposed that a trainman desires to manually effect a release of this fluid under pressure from the brake cylinder device 2 to atmosphere. To do so, the trainman will momentarily exert a pull on the actuating rod that is pivotally connected to the jaws of the clevis 168 of the reservoir release valve device 67. This pull is transmitted to the lower end of the actuator 166 and is effective to tilt its head 165 upward since this head 165 normally rests on the flange formed by the bottom of the counterbore 167 in the bottom cover member 155. As the head 165 is thus tilted upward, it is effective to move the follower 153 and the stems 161 and 162 upward since the lower end of each of these stems rests on the follower 153 as can be seen from FIG. 2. The stem 162 is longer than the stem 161. Therefore, assume that the pull exerted by the trainman on the actuating rod moves the follower 153 and stems 161 and 162 upward only far enough for the stem 162 to effect unseating of the corresponding check valve 156, without the stem 161 effecting unseating of the check valve 145. Since the chamber 157 is connected to the auxiliary reservoir 3 via branch passageway 26a and passageway and corresponding pipe 26, when the check valve 156 is unseated in the manner just explained, fluid under pressure flows from the chamber 157 and auxiliary reservoir 3 to atmosphere via bore 160, counterbore 151, choke 152 in follower 153, counterbore 167 and bore 154 at a rate controlled by the size of the choke 152. Since the choke 152 restricts the rate of flow of fluid under pressure from the counterbore 151 to atmosphere, some of the fluid under pressure supplied from the auxiliary reservoir 3 and chamber 157 past the unseated check valve 156 to the interior of the bore 160 flows therefrom to the chamber 107 below the diaphragm 104 via pasageway 119, choke 119a, elongated peripheral annular groove 99 on the brake cylinder release valve 90, short passageways 120 and 120a in parallel, chamber 121, and passageway 122. As fluid under pressure is thus supplied to the chamber 107, the pressure therein increases to cause the diaphragm 104 to be deflected upward against the yielding resistance of the spring 110.

Since the diaphragm 104 is operatively connected to the brake cylinder release valve 90 by means of the diaphragm followers 101 and 102 and nut 103, the brake cylinder release 90 is moved upward by the upward deflection of the diaphragm 104. Consequently, when the brake cylinder release valve 90 is thus moved upward far enough for the middle O-ring 100 thereon to be above the opening of the passageway 120 at the wall surface of the bore 84 in the casing section 65, the elongated peripheral annular groove 98 on this release valve 90 establishes a communication between the passageway 52 and the restricted passageway 120. The pressure in the passageway 52 is the same as that in the brake cylinder device 2 which, for example, as hereinbefore stated, is thirty-seven and one-half pounds per square inch. Therefore, fluid at this pressure will flow from the passageway 52 to the chamber 107 below the diaphragm 104 via the elongated peripheral annular groove 98, passageway 120, chamber 121 and passageway 122. Fluid at a pressure of thirty-seven and one-half pounds per square inch thus supplied to the chamber 107 is effective to deflect the diaphragm 104 upward against the yielding resistance of the spring 110 until the upper diaphragm follower 102 is moved into contact with the inturned flange 113 on the spring seat 114, it being understood that the strength of the caged spring 112 is sufficient to prevent further upward deflection of the diaphragm 104 by a pressure of thirty-seven and one-half pounds per square inch in the chamber 107.

When the brake cylinder release valve 90 is moved upward as described above, the dished lower end thereof is moved upward and away from the valve seat member 89 thereby breaking the seal between this dished lower end of the release valve 90 and the valve seat member 89. When this seal is thus broken, the fluid under pressure in the brake cylinder device 2 (FIG. 1) is completely vented to atmosphere via pipe and corresponding passageway 97, chamber 96, past unseated inshot valve 94, chamber 93, pasageways 92 and 91 (FIG. 2), bore 84, bore 83, chamber 82 and past the rubber shield 86 thus effecting a release of the brakes on the car provided with brake controlling valve device 5.

It may be noted that at this time fluid under pressure is also vented from the interior of the blind bore 118 and coaxial counterbore 123 above the piston valve 124 to atmosphere via passageway 117, bore 84, bore 83, chamber 82 and past the rubber shield 86.

It will be remembered that in lap position of the service slide valve 25 and graduating valve 24, the auxiliary reservoir pressure present in the chamber 23 and the brake pipe pressure present in the chamber 23 are equal. Therefore, it should be noted that when the trainman manually effects unseating of the check valve 156, in the manner hereinbefore described, to supply fluid under pressure from the auxiliary reservoir 3 to the chamber 107, this causes a reduction in the pressure in the auxiliary reservoir and also in the slide valve chamber 23 which is connected to the auxiliary reservoir 3 via passageway and corresponding pipe 26. Consequently, when the auxiliary reservoir pressure in the chamber 23 below the service valve diaphragm 16 is thus reduced below the brake pipe pressure in chamber 22 above the diaphragm 16, the higher brake pipe pressure present in the chamber 22 is rendered effective to deflect the diaphragm 16 downward to, through the intermediary of the service valve operating stem 18, move the graduating valve 24 and service slide valve 25 from their service lap position to their release position.

Furthermore, it should be noted that, subsequent to the trainman releasing the actuating rod pivotally connected to the jaws of the clevis 168, the spring 158 will effect seating of the check valve 156 on the valve seat 159 to cut off flow of fluid under pressure from the auxiliary reservoir 3 to the chamber 107 below the diaphragm 104, and that, subsequent to upward movement of the brake cylinder release valve 90 to the above described position in which the middle O-ring 100 thereon is disposed above the opening of the passageway 120 at the wall surface of the bore 84 (and below the opening of the passageway 120a at the wall surface of the bore 84), the fluid under pressure present in the chamber 107 will be vented to atmosphere via passageway 122, chamber 121, passageway 120a, elongated peripheral annular groove 99 on the brake cylinder release valve 90, choke 119a, passageway 119, bore 160, counterbore 151, choke 152 in follower 153, counterbore 167 and coaxial bore 154 at a rate determined by the size of chokes 119a and 152. As fluid under pressure is thus vented from the chamber 107 below the diaphragm 104, the spring 110 is rendered effective to deflect the diaphragm 104 downward and thereby move the brake cylinder release valve 90 downward to the position shown in FIG. 2 of the drawings in which position communication between the passageway 91, which is connected to the brake cylinder device 2, and atmosphere is closed. Also in this position of the brake cylinder release valve 90, the elongated peripheral annular groove 98 thereon establishes a communication between the passageway 92, which is connnected to the brake cylinder device 2, and the passageway 52 which is open to atmosphere via the cavity 170 in the left-hand face of the service slide valve 25 and the passageway 51.

The brake equipment can now be recharged in the manner hereinbefore described under Initial Charging. However, if now prior to recharging the brake equipment, a further reduction in the brake pipe 1 be effected, the brake control valve device 5 will operate in the manner hereinbefore described to effect the supply of fluid under pressure to the brake cylinder device 2 to cause a brake application, it being noted that the brake cylinder release valve 90 is now in the position shown in FIG. 2 to permit further flow of fluid under pressure from the auxiliary and emergency reservoirs to the brake cylinder device 2 as required by the hereinbefore-mentioned specification (a) of the Association of American Railroads.

*Service application in which brake cylinder pressure developed is forty pounds per square inch or higher*

Let it be supposed that it is desired to effect a brake application in which the pressure developed in the brake cylinder device 2 is forty pounds per square inch or higher, for example forty-five pounds per square inch. Therefore, in order to effect a brake application in which the pressure obtained in the brake cylinder device 2 is, for example, forty-five pounds per square inch, the pressure in the brake pipe 1 will be reduced from a normal charged value of seventy pounds per square inch to fifty-two pounds per square inch at a service rate in the usual way.

The brake control valve device 5 operates in response to this reduction in the pressure in the brake pipe 1 in the manner hereinbefore described in detail to first move to service position to effect the supply of fluid under pressure from the auxiliary reservoir 3 to the brake cylinder device 2 until the pressure in the auxiliary reservoir 3 is reduced by flow to the brake cylinder device 2 to substantially the same value as the reduced brake pipe pressure, and thereafter move to service lap position to cut off further flow of fluid under pressure from the auxiliary reservoir 3 to the brake cylinder device 2 when the pressure in the brake cylinder device 2 has reached a value of forty-five pounds per square inch.

*Manual release of brakes subsequent to a service application in which brake cylinder pressure developed is forty pounds per square inch or higher*

Assuming a service brake application has been effected in which the hereinbefore-mentioned pressure of forty-five pounds per square inch is developed in the brake cylinder device 2, let it be supposed that a trainman desires to manually effect a release of this fluid under pressure from the brake cylinder device 2 to atmosphere. To do so, the trainman will momentarily exert a pull on the actuating rod that is pivotally connected to the jaws of the clevis 168 of the reservoir release valve device 67 whereupon the check valve 156 is unseated in the manner hereinbefore-described in detail to effect the supply of fluid under pressure from the auxiliary reservoir 3 to the chamber 107 below the diaphragm 104 to cause this diaphragm to move the brake cylinder release valve 90 upward as hereinbefore-described to the position in which the elongated peripheral annular groove 98 on the valve 90 establishes a communication between the passageway 52 and the passageway 120. In this position of the brake cylinder release valve 90, the passageway 92 is open to atmosphere as hereinbefore described. When the passageway 92 is thus opened to atmosphere, fluid under pressure will be completely released from the brake cylinder device 2 via the pathway hereinbefore-described thus effecting a release of the brakes on the car provided with the brake control valve device 5.

When the elongated annular groove 98 establishes a communication between the passageway 52 and the passageway 120, fluid at the hereinbefore-mentioned pressure of forty-five pounds per square inch present in the passageway 52 flows to the chamber 107 via the pathway hereinbefore described. This pressure of forty-five pounds per square inch present in the chamber 107 is sufficient to overcame the yielding resistance of the spring 110 and also the yielding resistance of the caged spring 112. Therefore, subsequent to movement of the diaphragm follower 102 into contact with the inturned flange 113 on the spring seat 114, the diaphragm 104 is further deflected in an upward direction against the combined yielding resistance of the springs 110 and 112 to move the brake cylinder release valve 90 upward until the diaphragm follower 102 contacts a stop surface 174 formed on the cover member 105. In this position of the brake cylinder release valve 90, the middle O-ring 100 thereon is disposed above the location at which one end of the passageway 120a opens at the wall surface of the bore 84 and forms a seal with this wall surface. Consequently, the fluid under pressure in the chamber 107 cannot be vented therefrom to atmosphere via the choke 119a, passageway 119, bore 160, counterbore 151, choke 152, counterbore 167 and coaxial bore 154. Accordingly, the brake cylinder release valve 90 will remain in its uppermost position until fluid under pressure is vented from the chamber 107 either as the result of leakage of fluid under pressure from the auxiliary reservoir 3 while a car is setting on a side track subsequent to effecting an emergency application, or in response to the return of the service slide valve 25 and graduating valve 24 to their release position upon effecting a release of the brake application.

It will be noted that when an emergency brake application is effected, the service slide valve 25 and the graduating valve 24 are moved to their service position and remain in their service position until the brake pipe is again recharged. Therefore, while a car is setting on a side track subsequent to effecting an emergency brake application and thereafter a manual release of the brakes is effected whereby the brake cylinder release valve 90 is moved to its uppermost position, the auxiliary reservoir 3 is connected to the chamber 107 below the diaphragm 104 via the pipe and corresponding passageway 26, service slide valve chamber 23, passageway 81 in the service slide valve 25, passageway 52 in casing sections 13 and 65, elongated peripheral annular groove 98 on brake cylinder release valve 90 now in its uppermost position, passageways 120 and 120a in parallel, chamber 121 and passageway 122. Accordingly, it will be apparent that leakage of fluid under pressure from the auxiliary reservoir 3 while the car is sitting on a side track will correspondingly reduce the pressure in the chamber 107, and when the pressure in this chamber is reduced sufficiently as the result of leakage, the springs 110 and 112 will return the diaphragm 104 and brake cylinder release valve 90 to the position shown in FIG. 2.

It will also be noted that when the car is again coupled into a train and the brake pipe pressure is thereafter increased to its normal full charged value to cause the release of a brake application, the service slide valve 25 and the graduating valve 24 are returned to their release position shown in FIG. 2 of the drawings. Accordingly, when the service slide valve 25 is thus returned to its release position while the brake cylinder release valve 90 occupies its uppermost position, the fluid under pressure in the chamber 107 below the diaphragm 104, if it has not been lost by leakage as explained above, is vented to atmosphere via passageway 122, chamber 121, passageways 120 and 120a in parallel, elongated peripheral annular groove 98 on brake cylinder release valve 90, passageway 52, cavity 170, and passageway 51. Therefore, as fluid under pressure is thus vented from the chamber 107, the springs 110 and 112 are rendered effective to return the diaphragm 104 and brake cylinder release valve 90 from their uppermost position to the position in which they are shown in FIG. 2.

From the foregoing it is apparent that the brake cylinder release valve 90 conforms to specification (b) of the Association of American Railroads in that this release valve prevents further flow of fluid under pressure from the auxiliary and emergency reservoirs to the brake cylinder device 2, if at the time of its actuation the brake cylinder pressure is forty pounds per square inch or higher.

Having now described the invention, what I claim as new and desire to secure by Letters Patent is:

1. A fluid pressure operated brake cylinder pressure release valve device for a railway car brake control valve device to which an auxiliay reservoir and a brake cylinder device are connected, said control valve device having a service portion and an emergency portion, said release valve device comprising:

(a) a casing having a bore therein and an exhaust valve seat formed at one end of the bore,
(b) a spool valve member slidably mounted in said bore and having intermediate its ends a plurality of spaced-apart elongated peripheral annular grooves and at one end an exhaust valve cooperable with said exhaust valve seat in a first position of said valve member to close communication between the brake cylinder device and atmosphere, one of said grooves being effective in said first position to establish a communication between the service portion of the brake control valve device and the brake cylinder device through which fluid under pressure is supplied from the auxiliary reservoir to the brake cylinder device upon movement of the service portion to a service position,
(c) a movable abutment operatively connected to said valve member to effect movement thereof from said first position to a second position and to a third position,
(d) spring means active on one side of said abutment for biasing said valve member to its said first position,
(e) manually operative valve means for effecting the supply of fluid under pressure to the other side of said abutment to cause movement of said valve member from said first position against the yielding resistance of said spring means to a second position in which said exhaust valve is unseated to release fluid under pressure from said brake cylinder device to atmosphere and said one groove establishes an unrestricted communication through which the service portion supplies fluid under pressure to said other side of said abutment and another of said grooves establishes a restricted communication between said other side of said abutment and atmosphere to thereby render said spring means effective to return said valve member to said first position subsequent to movement of the service portion from said service position to a lap position,
(f) a caged spring effective to yieldingly resist movement of said valve member only from said second position to a third position,
(g) said abutment being effective to cause movement of said valve member from said second position to said third position against the combined yielding resistance of said spring means and said caged spring only upon the pressure supplied by said service portion via said unrestricted communication to said other side of said abutment exceeding a certain chosen value, and
(h) said another groove in said third position of said valve member cutting off said restricted communication between said other side of said abutment and atmosphere whereby said valve member is maintained in said third position until the service portion is returned from its lap position to a release position in which fluid under pressure is vented thereby from said other side of said abutment to atmosphere.

2. A fluid pressure operated brake cylinder release valve device, as claimed in claim 1, further characterized in that in said third position of said spool valve member said one groove thereon establishes an unrestricted communication through which the service portion maintains the supply of fluid under pressure from the auxiliary reservoir to said other side of said abutment until the service portion moves from its service portion to its lap position, and in that subsequent to movement of said spool valve member to its third position a fluid pressure force is maintained on said other side of said abutment until the service portion is returned to a release position.

3. A fluid pressure operated brake cylinder pressure release valve device, as claimed in claim 1, further characterized in that said spring means and said caged spring are both active on the said one side of said abutment, and in that said caged spring is spaced from said abutment while said valve member occupies its said first position.

4. A fluid pressure operated brake cylinder pressure release valve device, as claimed in claim 1, further characterized in that said manually operative valve means is also operative to vent fluid under pressure from the auxiliary reservoir.

5. A fluid pressure operated brake cylinder pressure release valve device, as claimed in claim 1, further characterized in that the strength of said caged spring is such that the unit fluid pressure required on said another side of said abutment to effect movement of said valve member from said second position to said third position must be at least 40 pounds per square inch.

6. A fluid pressure operated brake cylinder pressure release valve device, as claimed in claim 1, further characterized in that said abutment cooperates with said casing to form on the opposite sides of said abutment two chambers, to one of which said manually operative means is effective to supply fluid under pressure, and in that the other of said two chambers communicates constantly with a longitudinal passage in said spool valve member to prevent dash pot action.

No references cited.

EUGENE G. BOTZ, *Primary Examiner.*